UNITED STATES PATENT OFFICE.

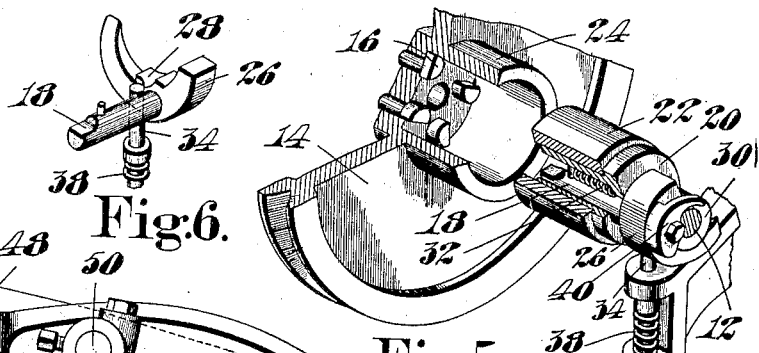
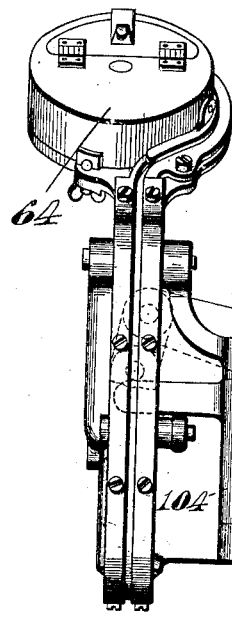
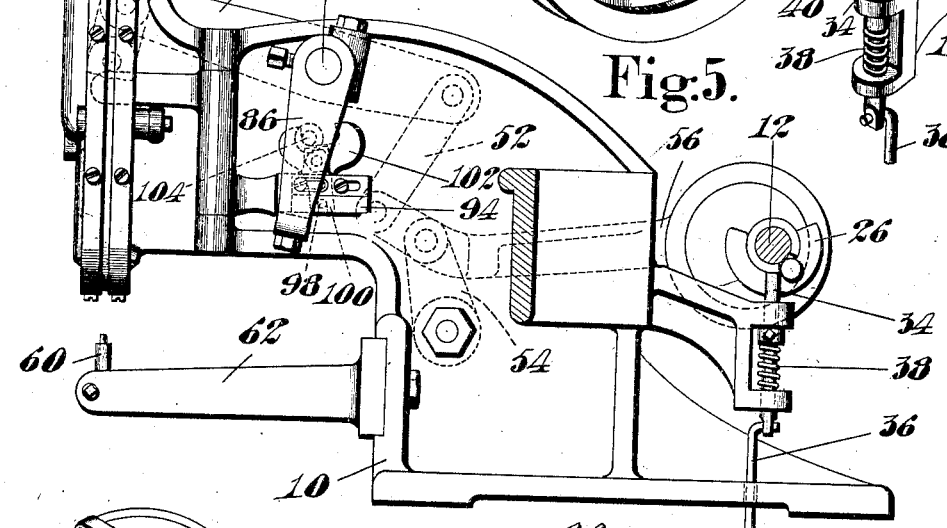
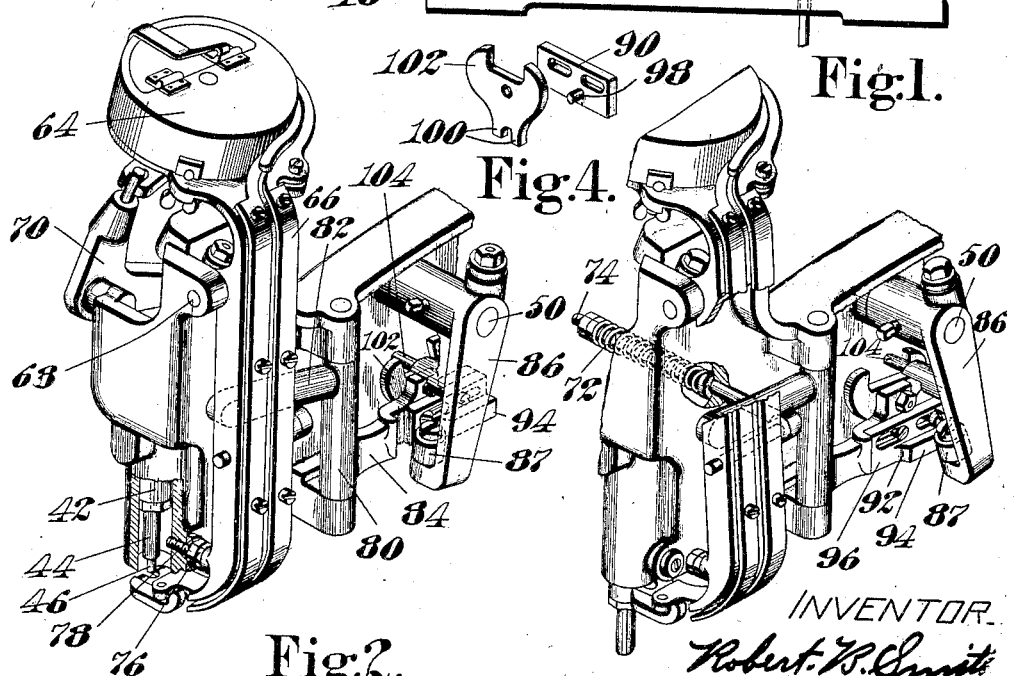

ROBERT B. SMITH, OF STOUGHTON, MASSACHUSETTS, ASSIGNOR TO UNITED SHOE MACHINERY CORPORATION, OF PATERSON, NEW JERSEY, A CORPORATION OF NEW JERSEY.

EYELETING-MACHINE.

1,351,138.   Specification of Letters Patent.   Patented Aug. 31, 1920.

Application filed January 21, 1918. Serial No. 212,972.

*To all whom it may concern:*

Be it known that I, ROBERT B. SMITH, a citizen of the United States, residing at Stoughton, in the county of Norfolk and State of Massachusetts, have invented certain Improvements in Eyeleting-Machines, of which the following description, in connection with the accompanying drawings, is a specification, like reference characters on the drawings indicating like parts in the several figures.

This invention relates to fastener inserting machines and is herein illustrated as embodied in a machine for setting eyelets, hooks, or the like, in sheet material.

Eyeleting machines of the type in question commonly include a reciprocable eyelet presenting device and a movably mounted raceway for delivering eyelets to said presenting device, means being provided for moving said raceway into and out of the path of the presenting device so that the endmost eyelet in the raceway may be threaded by the presenting device and the raceway then drawn aside to prevent interference between it and the presenting device. In such machines, it is very desirable, if not indeed essential, that the movements of the raceway shall be so controlled that the time of movement of the raceway shall be altered during the cycle of movement of the presenting device.

An object of this invention is to provide improved means for operatively connecting a fastener positioning or presenting device to a fastener raceway which will secure the desired result and avoid interference between the raceway and the presenting device.

In fastener inserting machines in general, and particularly in machines of the type in question, it is frequently necessary to turn the machine over slowly in order to test the adjustment or watch the operation of the various parts. Commonly it has been necessary to remove the belt from the driving pulley in order to accomplish this result, and the removal and replacement of this belt is inconvenient and involves danger of accident to the operator.

In view of the latter conditions another object of the invention is to provide novel means arranged to lock the clutch in open or disconnected position so that the machine may be turned over by hand while the driving member of the clutch is rotating, without danger of accidental coupling of the driving and driven members of the clutch.

Other features of the invention will become apparent upon a consideration of the following specification taken in connection with the accompanying drawings, in which:—

Figure 1 is a side view of the machine with parts broken away and showing the operating parts in stop position;

Figs. 2 and 3 are angular perspectives of the raceway actuating mechanism with the parts in stop position in Fig. 2, and in another extreme position in Fig. 3;

Fig. 4 is a detail view showing the sliding cam block and its actuator;

Fig. 5 is a perspective with parts broken away showing the clutch mechanism; and Fig. 6 is a detail of part of said mechanism.

The operating parts of the machine are mounted upon a frame 10 and the moving parts are actuated by means of power supplied from a shaft 12. Loosely mounted upon this shaft is a belt pulley 14 provided with a plurality of studs 16, each of which has a flattened face adapted to engage the flattened face of a pin 18 which passes through a hole in a sleeve 20 fixed to the shaft. The sleeve 20 is surrounded by a bushing 22 which fits within an annular projection 24 upon the belt pulley 14.

Fixed to one end of the pin 18 is a wedge-shaped semi-circular member 26 which is provided with a lug 28 adapted to be received within a slot in an integral extension 30 of the sleeve 20. This pin 18 and the wedge-shaped member 26 must therefore turn with the shaft 12, but may be given a sliding movement axially of the shaft. A spring 32 is provided which is tensioned to hold the pin 18 normally in engagement with one of the studs 16, and when so engaged, power will be supplied by the pulley to the main shaft. When it is desired to stop the machine, a rod 34 is caused to pass into the path of movement of the wedge-shaped member 26 and, by engagement with the sloping surface thereof, it draws out the pin 18 against the tension of the spring 32. This rod 34 is arranged to be depressed by means of a treadle rod 36, and is normally pressed upwardly into the path of movement of the wedge-shaped member 26 by means of a spring 38. The machine may be started, therefore, by depressing the treadle rod 36 to allow the pin 18 to engage one of the studs 16. After the treadle rod is released, however, the machine will be stopped at the completion of the current revolution by reason of the engagement of the rod 34 with the wedge-shaped member as above described. A locking pawl 40 is pivotally mounted upon the member 26 and this pawl may be moved into engagement with the end of the extension 30 of the sleeve 20 to prevent operative movement of the pin 18 into engagement with one of the studs 16. The machine may then be turned over by hand for adjustment of the operating parts or other purpose without danger even though the belt continues to drive the pulley 14.

In the forward part of the frame there is mounted for vertical reciprocation, the usual plunger 42 carrying an upper set 44 which is provided with the customary spring pressed spindle 46. This mechanism acts as a fastener positioning or presenting device. Reciprocation of the plunger 42 is effected by a walking beam 48 connected to the upper end of the plunger by means of a short link and secured to a shaft 50 which is journaled in the frame. The actuation of this beam 48 is effected by means of toggle links 52, 54, which are straightened by means of an eccentric rod 56, which is actuated in turn by means of an eccentric upon the shaft 12. The lower set 60 is mounted in alinement with the upper set upon a forwardly projecting stud 62 which is supported upon the frame in any suitable manner.

Eyelets are supplied to the upper set by means of a hopper 64 and raceway 66 which are movable as a single piece pivoted at 68 upon the frame of the machine. A part of the usual agitator mechanism for stirring the eyelets in the hopper is shown at 70. The raceway 66 is urged, by means of a spring 72 surrounding a rod 74 pivotally attached to the raceway, into a position such that the lowermost eyelet in the raceway, which is retained therein by the usual spring actuated finger, is in alinement with the spindle 46, as shown in Fig. 3. The ultimate position of the raceway when moved inwardly by means of the spring 72 is controlled by the engagement of an adjustable stop 76 with a resilient member 78 attached to the frame of the machine. Movement of the raceway into and out of the path of reciprocation of the upper set is controlled by a bell crank lever 80 pivotally mounted upon the frame of the machine and provided with an arm 82 engaging one side of the raceway support and with an oppositely extending arm 84 which coöperates with a roller 87 upon the lower end of an arm 86 which is fixed upon the shaft 50. The outer end of the arm 84 is, however, provided with a sliding block 90 which is retained movably by means of screws passing through slots in said block. This member 90 is provided with a short and abrupt cam surface 92 joining two non-actuating faces 94, 96. Upon the opposite side of the block 90 there is provided a pin 98 which is arranged to be interposed between the forked ends 100 of an actuator 102, pivoted upon the back side of the arm 84. The upper end of this actuator is recessed, as shown in Fig. 4, and adapted to receive loosely a stud 104 upon the crank 86.

The operation of the machine will be as follows:

Assuming that the parts are in the position shown in Fig. 1, and that the treadle is about to be depressed so as to allow the pin 18 to engage one of the studs 16 upon the belt pulley, the shaft will be rotated, and, by turning the eccentric mounted thereon, will straighten out the toggle links 52, 54 and cause the oscillation of the walking beam 48 and the depression of the plunger 42 with its set 44. The spindle in the set will be thereby threaded through the lowermost eyelet in the raceway, but before the set 44 contacts with the end of the raceway, the latter will be moved aside by reason of the actuation of the bell crank lever 80 from the arm 86. During this part of the cycle of operation, the roller upon the lower end of the crank 86 will ride up the cam surface 92 to the higher level 94 on the block 90 and thereby pull the raceway out of alinement with the upper set. The upper set will continue to descend, and, by co-action with the upsetting die 60 secure the eyelet in the work interposed between the sets. As the shaft continues to rotate, the toggle 52, 54 will be again broken and the plunger 42 with its set 44 will be raised out of engagement with the work. At about the same time, the raceway 66 will be moved into alinement with the set by means of the spring 72 so that when the cycle of the machine is repeated, the lowermost eyelet in the raceway may be again threaded by the spindle 46. This return movement of the raceway, however, is controlled by the bell crank lever 80. In this connection it should be noted that the actuating face or rise 92 of the cam-plate is relatively near the front end of the latter, in consequence of which the roller 87 does not have so far to travel, in moving from front to rear, before encountering the rise, as it does after leaving the rise. The effect of the rise is to displace the end of the raceway quickly from the path of the upper set when the latter has traversed far enough to insert the tip of the spindle through the eyelet barrel. As the set is about to complete its downstroke, the finger 104 shifts the cam-plate forwardly so that, during the upstroke of the set, the roll 87 will have farther to travel before reaching the face 92 than it had to travel after leaving said face during the downstroke. Thus the beginning of the return movement of the raceway is postponed until the upper set has reached a higher level than it occupied when the raceway was removed from its path, and the tip of the spindle is therefore enabled to clear the leading eyelet in the raceway. After the return movement of the raceway has begun the finger 104 shifts the cam-plate to the rear, such shifting ending simultaneously with the upstroke of the upper set.

An important feature of this mechanism is the relatively abrupt character and postponed action of the active portion 92 of the cam-plate. This, in conjunction with the shifting of the cam-plate, which begins after the portion 92 has acted, postpones the beginning of the return movement of the raceway enough to clear the spindle during the upstroke.

Having thus described my invention, what I claim as new and desire to secure by Letters Patent is:

1. In a machine of the character described, a fastener-engaging device, a raceway for supplying fasteners thereto, means arranged to reciprocate said device to operate on a fastener, said device and the delivery end of the raceway being relatively movable transversely of the path of operating movement of said device, mechanism arranged to cause such relative transverse movement of the raceway and said device, and means operable by said reciprocating means to alter the potential timing of said mechanism with respect to the next stroke after the one in which the alteration occurs.

2. In a machine of the character described, a reciprocable fastener-engaging device, means arranged to reciprocate said device, a raceway the delivering end of which is movable into and out of the path of said device, and mechanism arranged to be operated by a reciprocatory element of said means to control the movement of the raceway, said mechanism including a cam arranged to control the timing of the raceway, said cam being shiftable relatively to said mechanism, to vary such timing, and means arranged to shift said cam during the latter stages of one of the strokes of said device.

3. In a machine of the character described, a reciprocable fastener-engaging device, means arranged to reciprocate said device, a raceway the delivering end of which is movable into and out of the path of said device, and mechanism arranged to be operated by a reciprocatory element of said means to control the movements of the raceway, said mechanism including a controlling cam and a carrier therefor relatively to which the cam is shiftable to alter the timing of the raceway movements, and means arranged to be operated by said reciprocatory element to shift said cam relatively to its carrier during the latter stages of each stroke of said device.

4. In a machine of the character described, a reciprocable fastener-engaging device, means arranged to reciprocate said device, a raceway the delivering end of which is movable into and out of the path of said device, and mechanism arranged to be operated by a reciprocatory element of said means to control the movements of the raceway, said mechanism including a raceway-operating cam having two relatively long dwell portions connected by a relatively short actuating portion, said cam being shiftable to alter the effective timing of said actuating portion, and means arranged to shift said cam during the latter stages of each stroke of said device to postpone the operation of said actuating portion during the next succeeding stroke of said fastener-engaging device.

5. In a machine of the character described, a reciprocable fastener-engaging device, means arranged to reciprocate said device, a raceway the delivering end of which is movable into and out of the path of said device, and mechanism arranged to be operated by a reciprocatory element of said means to control the movements of the raceway, said mechanism including a cam arranged to move the raceway, a reciprocatory member arranged to operate the cam and means arranged to alter the relation between the cam and said reciprocatory member during the latter stages of each stroke of the fastener-engaging device.

6. In a machine of the character described, a reciprocable fastener-engaging device, means arranged to reciprocate said device, a raceway the delivering end of which is movable into and out of the path of said device, and mechanism arranged to be operated by a reciprocatory element of said means to control the movements of the raceway, said mechanism including a cam and a companion member arranged to co-act to operate the raceway, and means arranged to move the cam and said companion member in opposite directions relatively to each other during the latter stages of each stroke of the fastener-engaging device.

7. In a fastener inserting machine, a movable raceway, operating mechanism including an oscillatory member, alterable connections connecting said oscillatory member with said raceway to move the latter, and means controlled by the movements of the oscillatory member for altering said operative connections during the latter stages of movement of said member.

In testimony whereof I have signed my name to this specification.

ROBERT B. SMITH.